(12) United States Patent
Jahne et al.

(10) Patent No.: US 10,474,470 B2
(45) Date of Patent: Nov. 12, 2019

(54) TECHNIQUES DEPLOYMENT SYSTEM

(71) Applicant: The Boeing Company, Chicago, IL (US)

(72) Inventors: Seth L. Jahne, Anaheim, CA (US); Blake Jeffrey Harnden, Lake Forest, CA (US); Eric R. Van Alst, Lake Forest, CA (US); James M. Chan, Fullerton, CA (US); James M. Kalasky, Tustin, CA (US); Andrew Paul Riha, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 416 days.

(21) Appl. No.: 14/313,401

(22) Filed: Jun. 24, 2014

(65) Prior Publication Data

US 2015/0369569 A1 Dec. 24, 2015

(51) Int. Cl.
| | | |
|---|---|---|
| *G06F 9/00* | (2006.01) | |
| *G06F 9/44* | (2018.01) | |
| *F41G 3/04* | (2006.01) | |
| *F41G 9/00* | (2006.01) | |

(52) U.S. Cl.
CPC ............ *G06F 9/44* (2013.01); *F41G 3/04* (2013.01); *F41G 9/00* (2013.01)

(58) Field of Classification Search
CPC ............... G06F 9/44; F41G 3/04; F41G 9/00
USPC .............................. 726/22; 709/204; 235/413
See application file for complete search history.

(56) References Cited

U.S. PATENT DOCUMENTS

| | | |
|---|---|---|
| 6,697,008 B1 | 2/2004 | Sternowski |
| 8,186,589 B2 | 5/2012 | Ben Asher et al. |
| 2006/0010389 A1* | 1/2006 | Rooney ............... H04L 63/1425 715/736 |
| 2008/0123545 A1* | 5/2008 | Watanabe ............. H04L 43/026 370/252 |
| 2015/0067850 A1* | 3/2015 | Baikalov ............. H04L 63/1408 726/23 |

OTHER PUBLICATIONS

Jonathan Strickland "How Zombie Computers Work" Sep. 10, 2007. HowStuffWorks.com. <http://computer.howstuffworks.com/zombie-computer.htm> Jan. 26, 2016.*

* cited by examiner

*Primary Examiner* — Daniel A Hess
(74) *Attorney, Agent, or Firm* — Yee & Associates, P.C.

(57) ABSTRACT

A method and apparatus for generating an effect. The apparatus comprises a group of tactical controllers and a mission controller. The group of tactical controllers control heterogeneous types of hardware to generate an effect for at least one of electronic warfare operations or cyber mission operations. A selected tactical controller in the group of tactical controllers controls a particular type of hardware using a technique that is specific for controlling the particular type of hardware to generate the effect. The mission controller identifies the effect for the selected tactical controller and assigns a task to the selected tactical controller. The selected tactical controller performs the task to control a particular type of hardware using the technique to generate the effect for at least one of the electronic warfare operations or the cyber mission operations.

20 Claims, 13 Drawing Sheets

TECHNIQUES DEPLOYMENT SYSTEM

BACKGROUND INFORMATION

1. Field

The present disclosure relates generally to missions and, in particular, to managing missions. Still more particularly, the present disclosure relates to a method and apparatus for managing different types of systems used in missions.

2. Background

Electronic warfare (EW) missions and cyber missions are examples of types of missions that may be performed. These types of missions are often performed by different countries or organizations. The targets of these missions may be communications systems, radar systems, computer networks, and other assets.

Electronic warfare missions involve the use of the electromagnetic spectrum, directed energy, or both. Electronic warfare missions may be performed to deny opponents access to using the electromagnetic spectrum for things like communications, detection, or other purposes. Electronic warfare missions can be performed from different locations, such as air, sea, land, and outer space by manned or unmanned systems.

Cyber missions involve performing operations with respect to networks such as local area networks, wide area networks, the Internet, and other types of networks. Cyber missions may be performed to obtain information, change information, insert information, or other suitable operations. The information may be, for example, data, programs, voice data, images, videos, or other types of information.

Managing systems for performing missions may be more difficult than desired. Different vendors or sources may provide the systems for performing electronic warfare and cyber missions. Different tools and applications are often present for operating these systems. Further, the user interfaces for different systems may vary greatly from one system to another system. As a result, operators for the systems require training on the different systems. As a result, only certain operators may operate selected systems for which those operators have training. This situation may require more expense and time than desired to hire and train operators to use these systems.

Thus, coordinating the performance of electronic warfare missions and cyber missions is not straightforward. Currently, the coordination requires the use of both tools and applications with which the different operators must be familiar in order to perform missions. Therefore, it would be desirable to have a method and apparatus that take into account at least some of the issues discussed above, as well as other possible issues.

SUMMARY

In one illustrative embodiment, an apparatus comprises a group of tactical controllers and a mission controller. The group of tactical controllers control heterogeneous types of hardware to generate an effect for at least one of electronic warfare operations or cyber mission operations. A selected tactical controller in the group of tactical controllers controls a particular type of hardware using a technique that is specific for controlling the particular type of hardware to generate the effect. The mission controller identifies the effect for the selected tactical controller and assigns a task to the selected tactical controller. The selected tactical controller performs the task to control the particular type of hardware using the technique to generate the effect for at least one of the electronic warfare operations or the cyber mission operations.

In another illustrative embodiment, a techniques deployment system for electronic warfare and cyber missions comprises a group of tactical controllers, a mission controller, and a computer system. The group of tactical controllers control heterogeneous types of hardware to generate effects for at least one of electronic warfare operations or cyber mission operations. A selected tactical controller in the group of tactical controllers controls a particular type of hardware using a technique that is specific for controlling the particular type of hardware to generate an effect. The mission controller identifies the effect for the selected tactical controller and assigns a task to the selected tactical controller. The selected tactical controller performs the task to control the particular type of hardware using the technique to generate the effect for at least one of the electronic warfare operations or the cyber mission operations. The computer system has a graphical user interface that displays a visualization of information received from the group of tactical controllers and receives selections of the effects desired.

In yet another illustrative embodiment, a method for generating an effect is provided. The effect for a selected tactical controller in a group of tactical controllers is identified by a mission controller. The group of tactical controllers control heterogeneous types of hardware to generate the effect for at least one of electronic warfare operations or cyber mission operations. The selected tactical controller in the group of tactical controllers controls a particular type of hardware using a technique that is specific for controlling the particular type of hardware to generate the effect. A task is assigned to the selected tactical controller. The task is performed by the selected tactical controller to control the particular type of hardware using the technique to generate the effect for at least one of the electronic warfare operations or the cyber mission operations.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current systems for electronic warfare missions and cyber missions are designed and manufactured for individual capabilities for these types of missions. The illustrative embodiments also recognize and take into account that an architecture for allowing unified management of these different types of capabilities is absent. The illustrative embodiments further recognize and take into account that it would be desirable to have an architecture that allows for the coordination of the different types of systems in a manner that does not require training for each type of system that may be used in electronic warfare missions and cyber missions.

Thus, the illustrative embodiments provide a method and apparatus for managing missions. In particular, one illustrative embodiment provides a method and apparatus for managing electronic warfare missions and cyber missions. For example, an apparatus comprises a mission controller and a group of tactical controllers. As used herein, "a group of" when used with reference items means one or more items. A group of tactical controllers is one or more tactical controllers.

The tactical controllers control heterogeneous types of hardware to generate an effect for at least one of electronic warfare operations or cyber mission operations. A selected tactical controller in the group of tactical controllers controls a particular type of hardware using a technique that is specific for controlling the particular type of hardware to generate an effect.

The mission controller identifies the effect for the selected tactical controller and assigns a task for the selected tactical controller. The selected tactical controller performs the task controlling the particular type of hardware using the technique to generate the effect for at least one of the electronic warfare operations or cyber mission operations.

As used herein, the phrase "at least one of," when used with a list of items, means different combinations of one or more of the listed items may be used and only one of each item in the list may be needed. In other words, at least one of means any combination of items and number of items may be used from the list but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations.

Figure 1:
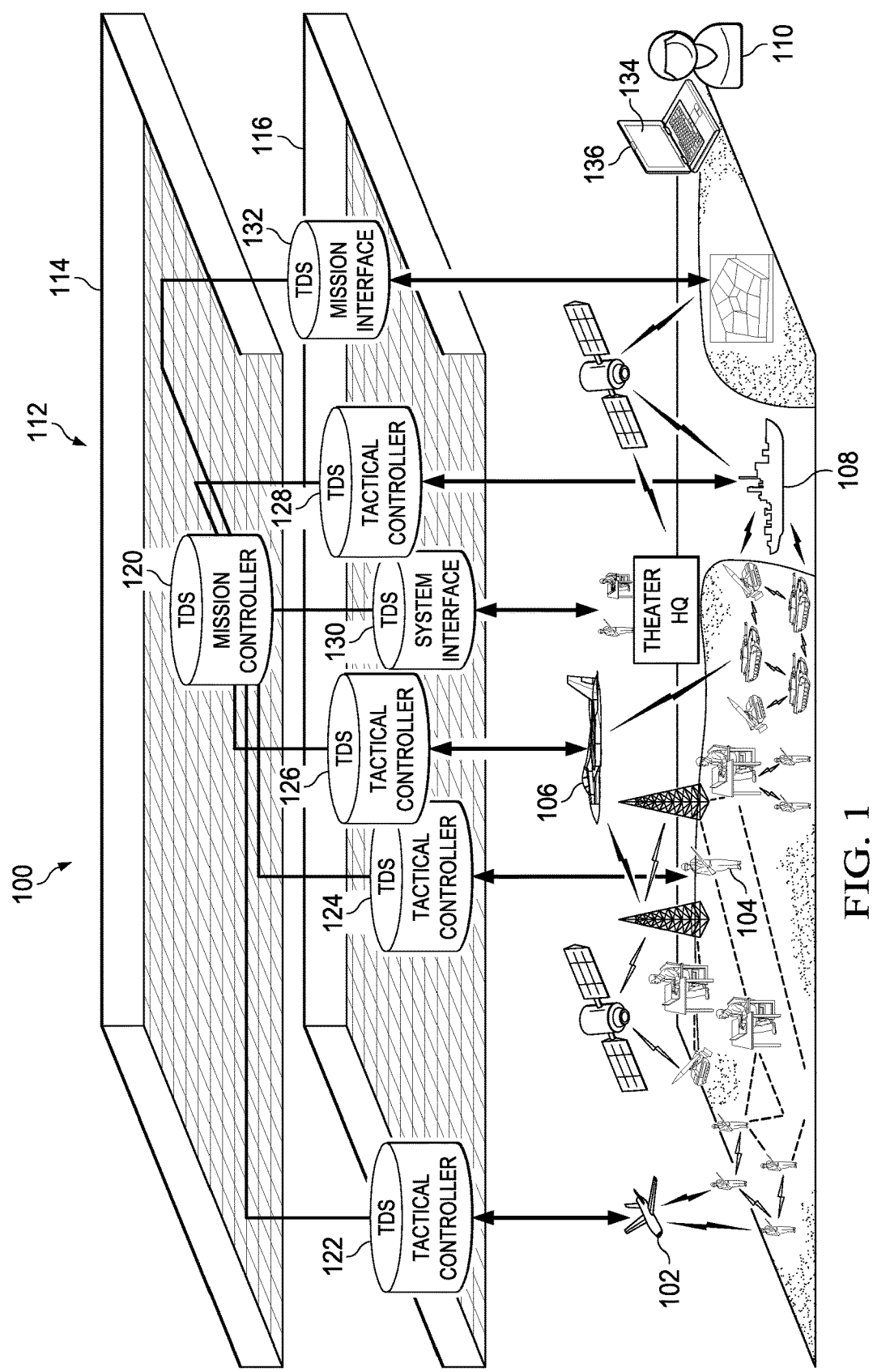
FIG. 1 is an illustration of a mission environment in accordance with an illustrative embodiment.

With reference now to the figures and, in particular, with reference to FIG. 1, an illustration of a mission environment is depicted in accordance with an illustrative embodiment. In this illustrative example, mission environment 100 is one in which electronic warfare missions and cyber missions are performed.

Unmanned aerial vehicle (UAV) 102, human operator 104, aircraft 106, and surface ship 108 are examples of a group of platforms that may be used to form at least one of electronic warfare missions or cyber missions. As depicted, hardware is located on these platforms for use in performing these types of missions. The hardware may include, for example, radios, phased array antennas, and other suitable types of hardware. As depicted, heterogeneous types of hardware are present on these platforms.

Typically, the hardware is from different sources. The hardware from one source often employs different types of applications, interfaces, communications protocols, and other features that operate differently from other types of hardware from other sources. In one illustrative example, a phased array antenna is used in aircraft 106 and supplied from a different source than the phased array antenna in surface ship 108.

In this illustrative example, these platforms may be managed by remote operator 110. In particular, remote operator 110 may manage these platforms using techniques deployment system (TDS) 112. In this illustrative example, techniques deployment system 112 comprises mission layer 114 and tactical layer 116.

Mission layer 114 allows remote operator 110 to control multiple tactical systems such as unmanned aerial vehicle (UAV) 102, human operator 104, aircraft 106, and surface ship 108. Additionally, mission layer 114 also provides remote operator 110 with visualization of the operations performed by these platforms. Further, mission layer 114 also allows remote operator 110 to have integrated management of these platforms. In other words, remote operator 110 may have an integrated system for command and control of the platforms through mission layer 114.

As depicted, tactical layer 116 supports access by the platforms. Further, tactical layer 116 is scalable to provide access to any number of platforms that may be used in electronic warfare missions and cyber missions. In this illustrated example, mission layer 114 includes mission controller 120. Tactical layer 116 includes tactical controller 122, tactical controller 124, tactical controller 126, tactical controller 128, system interface 130, and mission interface 132. Further, tactical controller 122 provides access to unmanned aerial vehicle 102; tactical controller 124 provides access to human operator 104; tactical controller 126 provides access to aircraft 106; and tactical controller 128 provides access to surface ship 108.

Tactical controller 122, tactical controller 124, tactical controller 126, and tactical controller 128 include techniques that control the hardware in the different platforms illustrated in this figure. Each tactical controller may have one or more techniques, depending on the particular implementation. Further, these tactical controllers may be located on the platforms in these illustrative examples. In other illustrative examples, the controllers may be located remotely to the platforms and may control the hardware by communicating with processes, controllers, or components on the platforms.

System interface 130 and mission interface 132 allows remote operator 110 to manage the hardware in the platforms, located remotely to the platforms, or both through interface 134. In this example, interface 134 is a graphical user interface that is displayed on computer 136 and may be used to control the hardware without remote operator 110 having to manage the hardware using different interfaces and processes. In other words, mission interface 132 is a common interface for at least one of the hardware or the platforms in which the hardware is located, in this particular example.

In this manner, remote operator 110 may view information about missions, manage missions, and command and control operations for the missions. Remote operator 110 may perform duties for electronic warfare missions and cyber missions using interface 134 in a manner that requires less training, time, and software or other resources as compared to currently used systems in which heterogeneous types of hardware are present that have different types of interfaces, protocols, commands, displays, and other systems.

The illustration of FIG. 1 is not meant to imply physical or architectural limitations to the manner in which different illustrative embodiments may be implemented. For example, although four tactical controllers are shown, other numbers of tactical controllers may be used. For example, mission environment 100 may include one tactical controller, ten tactical controllers, thirty-seven tactical controllers, or some other number of tactical controllers.

As another illustrative example, a tactical controller may control hardware in more than one platform. In other words, a tactical controller may control different pieces of hardware that may be located on different platforms. In yet another example, the platforms in mission environment 100 may be managed by any number of remote operators.

Figure 2:
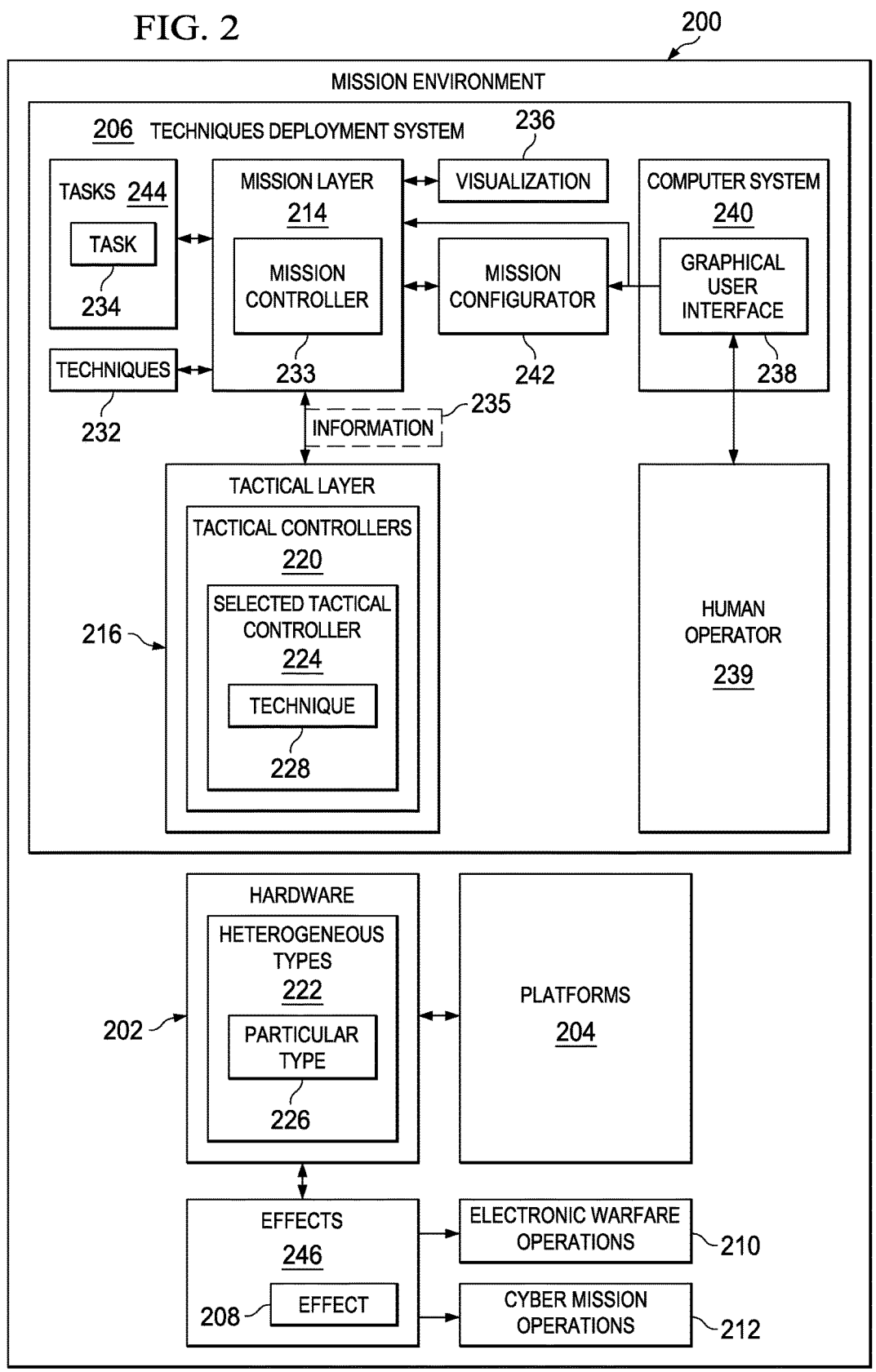
FIG. 2 is an illustration of a block diagram of a mission environment in accordance with an illustrative embodiment.

Turning next to FIG. 2, an illustration of a block diagram of a mission environment is depicted in accordance with an illustrative embodiment. Mission environment 100 in FIG. 1 is an example of one implementation of mission environment 200 shown in block form in FIG. 2.

As depicted, one or more pieces of hardware 202 are located on each group of platforms 204 in mission environment 200. As depicted, hardware 202 is controlled through techniques deployment system 206. Group of platforms 204 also may be controlled by techniques deployment system 206 in the illustrative example.

In this illustrative example, hardware 202 may take various forms. For example hardware 202 may be selected from at least one of a radio, a wireless access point, a phased array antenna, test equipment, a proprietary system, or some other suitable hardware. Group of platforms 204 may be selected from at least one of a mobile platform, a stationary platform, a human operator, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a house, a manufacturing facility, a building, or some other type of platform.

In the illustrative example, hardware 202 may operate to generate effect 208 for at least one of electronic warfare operations 210 or cyber mission operations 212. Effect 208 may take different forms. For example, effect 208 may be to spoof information, interrupt communications, degrade performance, bypass a firewall, collect information, rewrite packets, block wireless signals, and other suitable effects.

In the illustrative example, techniques deployment system 206 includes a number of layers. As used herein, "a number of," when used with reference to items means one or more items. For example, a number of layers is one or more layers. The layers include mission layer 214 and tactical layer 216.

Tactical layer 216 includes tactical controllers 220. A group of tactical controllers 220 controls heterogeneous types 222 of hardware 202 to generate effect 208 for at least one of electronic warfare operations 210 or cyber mission operations 212.

In the illustrative example, selected tactical controller 224 in the group of tactical controllers 220 controls particular type 226 of hardware 202 in heterogeneous types 222 of hardware 202 using technique 228 that is specific for controlling particular type 226 of hardware 202 to generate effect 208. As depicted, selected tactical controller 224 also may control multiple pieces of hardware 202 selected from one of a same type and a different type in heterogeneous types 222 using a group of techniques 232.

Mission layer 214 includes mission controller 233. Mission controller 233 coordinates the operation of at least one of hardware 202 or group of platforms 204. Mission controller 233 identifies effect 208 for selected tactical controller 224 and assigns task 234 to selected tactical controller 224. Selected tactical controller 224 performs task 234 to control particular type 226 of hardware 202 using technique 228 to generate effect 208 for at least one of the electronic warfare operations 210 or cyber mission operations 212. Mission layer 214 also may deploy techniques 232 to tactical controllers 220.

In the illustrative example, mission controller 233 receives information 235 from the group of tactical controllers 220 and displays visualization 236 of information 235 on graphical user interface 238 for viewing by human operator 239. Graphical user interface 238 may be displayed in computer system 240. Computer system 240 may be one or more computers and may include other devices, such as tablet computers, mobile phones and other suitable devices.

Techniques deployment system 206 may also include mission configurator 242. Mission configurator 242 selects a set of tasks 244 for multiple pieces of hardware 202 to generate a group of effects 246. Mission configurator 242 also selects a group of techniques 232 for the group of tactical controllers 220 for use in controlling the multiple pieces of hardware 202 to generate a group of effects 246. As depicted, human operator 239 may select at least one of tasks 244, techniques 232, effects 246, or other suitable components for use in controlling at least one of hardware 202 or group of platforms 204 for performing at least one of electronic warfare or cyber mission operations.

With techniques deployment system 206, graphical user interface 238 may be a common interface for human operator 239. Human operator 239 does not need to use a different graphical user interface for each piece of hardware 202 that is of a different type than other pieces of hardware 202.

In the illustrative example, different components in techniques deployment system 206 may be implemented in software, hardware, firmware or a combination thereof.

These components may include at least one of mission controller 233, tactical controllers 220, or mission configurator 242. When software is used, the operations performed by components may be implemented in program code configured to run on a processor unit. When firmware is used, the operations performed by components may be implemented in program code and data and stored in persistent memory to run on a processor unit. When hardware is employed, the hardware may include circuits that operate to perform the operations in components.

In the illustrative examples, the hardware may take the form of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

Figure 3:
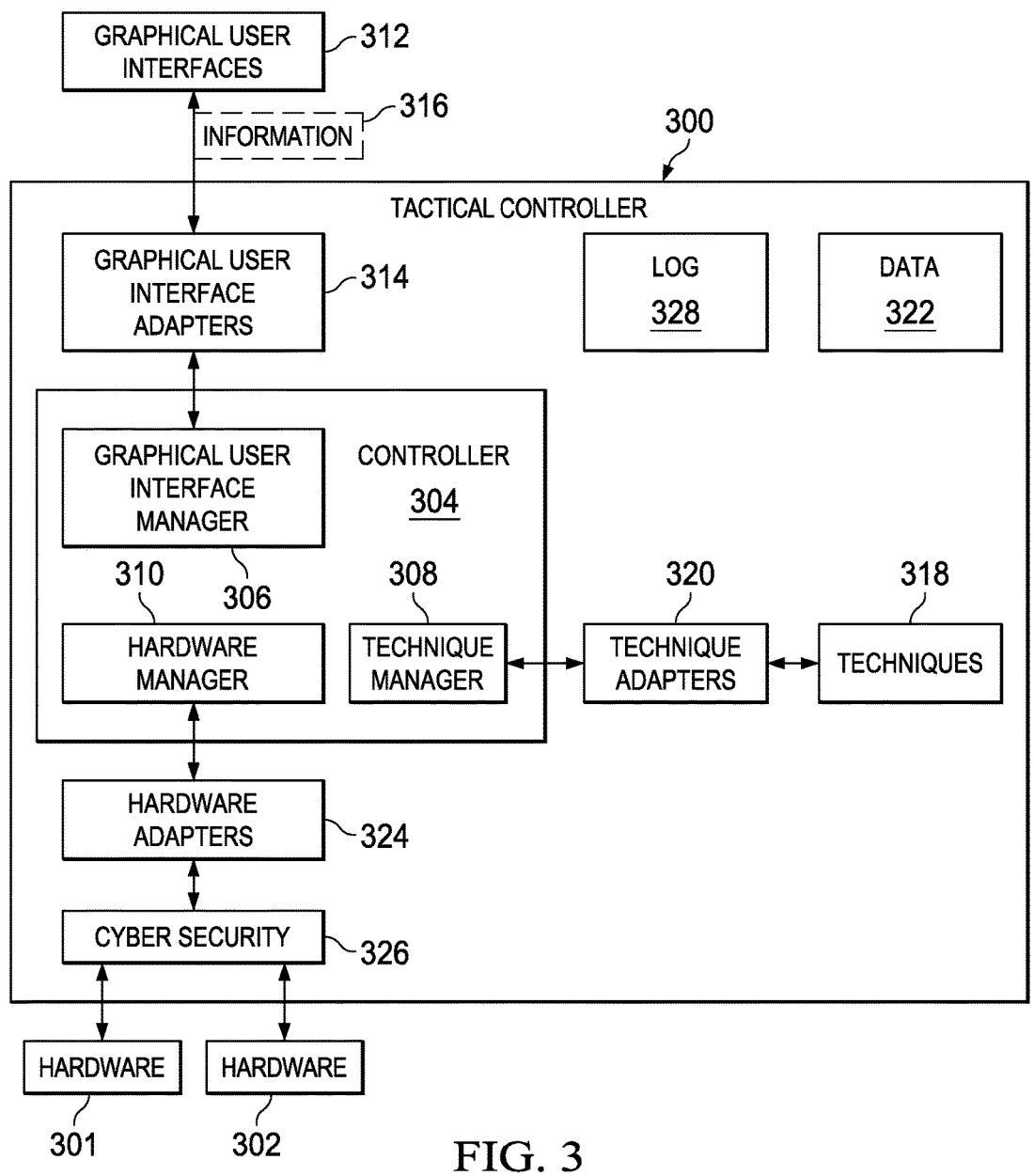
FIG. 3 is an illustration of a block diagram of a tactical controller in accordance with an illustrative embodiment.

Turning next to FIG. 3, an illustration of a block diagram of a tactical controller is depicted in accordance with an illustrative embodiment. In this figure, an example of components that may be in a tactical controller in tactical controllers 220 in FIG. 2 is shown. For example, tactical controller 300 may be an example of components in selected tactical controller 224 in FIG. 1.

In this illustrative example, tactical controller 300 controls hardware 301 and hardware 302. Hardware 301 and hardware 302 are examples of pieces of hardware 202 in FIG. 2.

As depicted, controller 304 is located on tactical controller 300. Controller 304 manages access to tactical controller 300. Controller 304 includes graphical user interface manager 306, technique manager 308, and hardware manager 310.

In the illustrative example, graphical user interface manager 306 controls graphical user interfaces 312. Graphical user interfaces 312 are examples of graphical user interface 238 in FIG. 2. In this illustrative example, graphical user interfaces 312 may be located in one or more computer systems. The one or more computer systems where graphical user interfaces 312 are located are examples of computer system 240 in FIG. 2.

As depicted, group of graphical user interface adapters 314 are used by graphical user interface manager 306 to convert information 316 sent between graphical user interfaces 312 and tactical controller 300. For example, group of graphical user interface adapters 314 may be used to convert information 316 from a format used in tactical controller 300 to another format used in graphical user interfaces 312. Each graphical user interface in graphical user interfaces 312 may use the same format for information or different formats for information 316. As used herein, a format for information is how the information is arranged in memory. For example, a format for information may be one or more of XML, JSON, YAML, binary, or text specified data or some other suitable type of format.

Technique manager 308 controls access from techniques 318 to other components of tactical controller 300 in this illustrated example. Technique manager 308 also controls access to techniques 318 from other components of tactical controller 300. Technique manager 308 may further control access between multiple techniques in techniques 318. Techniques 318 in tactical controller 300 are examples of technique 228 in FIG. 2. As depicted, group of technique adapters 320 are used by technique manager 308 to convert portions of data 322 sent to and received from techniques 318. Data 322 includes at least one of mission information, hardware information, data type definitions, data type converters, parameters selected for techniques 318, or any other suitable type of data for use by the components of tactical controller 300. Data type converters change data in a first data format to modified data in a second data format. For example, a data type converter may change text to binary.

In the illustrative example, hardware manager 310 controls access to a piece of hardware 301 and a piece of hardware 302 by techniques 318. As depicted, hardware manager 310 uses group of hardware adapters 324 to convert portions of data 322 sent to and received from the piece of hardware 301 and the piece of hardware 302. For example, the piece of hardware 301 may be from a first source and may use a first data format, and the piece of hardware 302 may be from a second source and may use a second data format.

In this illustrative example, group of hardware adapters 324 convert portions of data 322 using data type converters located in data 322. For example, a hardware adapter in group of hardware adapters 324 may identify and use a data type converter from data 322 needed to change the portion of data 322 from a first data format used in tactical controller 300 to a second data format used in the piece of hardware 301.

As depicted, hardware manager 310 uses cyber security 326 to prevent threats to tactical controller 300. For example, cyber security 326 may include firewalls that block unauthorized communications.

In this illustrative example, graphical user interface manager 306, technique manager 308, and hardware manager 310 work together to control communications between graphical user interfaces 312, techniques 318, the piece of hardware 301, and the piece of hardware 302. For example, when a technique in techniques 318 requires information from the piece of hardware 301, a request for the information from the technique is processed by technique manager 308 and hardware manager 310. In this example, the request and information returned by the piece of hardware 301 may be converted using one or both of group of hardware adapters 324 and group of technique adapters 320.

As depicted, techniques 318 may be selected and sent to tactical controller 300 by mission configurator 242 in FIG. 2. As also depicted, group of graphical user interface adapters 314, group of technique adapters 320, and group of hardware adapters 324 may be selected and sent to tactical controller 300 for use in converting data to desired formats. In this fashion, integration issues that may exist between various components of tactical controller 300 and between tactical controller 300 and graphical user interfaces 312, hardware 301, and hardware 302, are addressed using group of graphical user interface adapters 314, group of technique adapters 320, and group of hardware adapters 324.

The components of tactical controller 300 are implemented in hardware, software, or a combination of hardware and software. A record of all operations performed by the components in tactical controller 300 may be stored in log 328.

Figure 4:
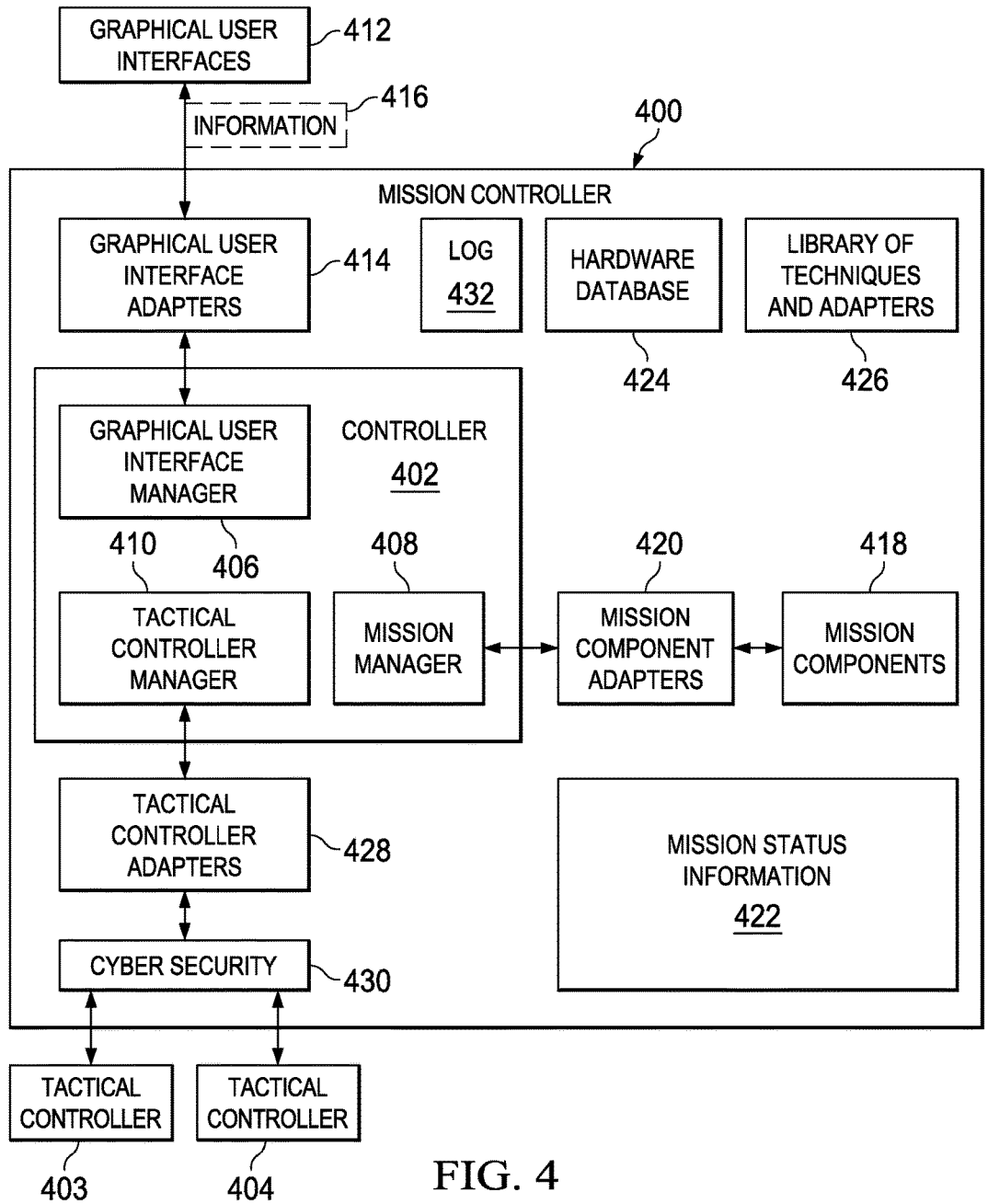
FIG. 4 is an illustration of a block diagram of a mission controller in accordance with an illustrative embodiment.

With reference to FIG. 4, an illustration of a block diagram of a mission controller is depicted in accordance with an illustrative embodiment. In this figure, an example of components that may be in a mission controller such as mission controller 233 in FIG. 2 is shown.

In this illustrative example, mission controller 400 controls access to tactical controller 403 and tactical controller 404. Tactical controller 403 and tactical controller 404 are examples of tactical controllers 220 in FIG. 2.

As depicted, controller 402 is located on mission controller 400. Controller 402 manages access to mission controller 400. Controller 402 includes graphical user interface manager 406, mission manager 408, and tactical controller manager 410.

In the illustrative example, graphical user interface manager 406 controls graphical user interfaces 412. Graphical user interfaces 412 are examples of graphical user interface 238 in FIG. 2. In this illustrative example, graphical user interfaces 412 may be located in a computer system. The computer system where graphical user interfaces 412 are located is an example of computer system 240 in FIG. 2.

As depicted, group of graphical user interface adapters 414 are used by graphical user interface manager 406 to convert information 416 sent between graphical user interfaces 412 and mission controller 400. For example, group of graphical user interface adapters 414 may be used to convert information 416 from a format used in mission controller 400 to a format used in graphical user interfaces 412. Each graphical user interface in graphical user interfaces 412 may use the same format or different formats for information 416.

Mission manager 408 controls mission components 418 in this illustrated example. Mission components 418 in mission controller 400 perform at least one of assessing the status of a mission, identifying commands to send to tactical controllers to assign tasks to tactical controllers, identifying hardware for producing effects, identifying techniques to assign to tactical controllers, and identifying adapters to assign to graphical user interface managers, technique managers, and hardware managers in tactical controllers, and other suitable operations of missions.

As depicted, group of mission component adapters 420 are used by mission manager 408 to convert data sent to and received from mission components 418. The data sent to and received from mission components 418 includes at least one of mission status information 422, portions of hardware database 424, parameters selected for techniques, or any other suitable type of data for processing operations of missions.

In this illustrative example, mission status information 422 is received from tactical controller 403 and tactical controller 404. Mission status information 422 comprises at least one of a status of tasks assigned to tactical controllers, a status of communications links with the tactical controllers, health of tactical controllers, or health of hardware used by tactical controllers.

As depicted, hardware database 424 includes information about pieces of hardware. For example, hardware database 424 may include mappings between types of hardware and tactical controllers, mappings between tactical controllers and platforms, mappings between pieces of hardware and platforms, coordinates of pieces of hardware and platforms, availability status of pieces of hardware and platforms, and lists of components currently in tactical controllers. As used herein, mappings between items and components is a number of mappings between a number of the items and a number of the components.

In the illustrative example, tactical controller manager 410 controls tactical controller 403 and tactical controller 404. As depicted, tactical controller manager 410 uses group of tactical controller adapters 428 to convert information in messages sent to and received from tactical controller 403 and tactical controller 404. For example, tactical controller 403 may be from a first source and may use a first set of data formats and tactical controller 404 may be from a second source and may use a second set of data formats.

As depicted, tactical controller manager 410 uses cyber security 430 to prevent threats to mission controller 400. For example, cyber security 430 may include firewalls that block unauthorized communications.

In this illustrative example, graphical user interface manager 406, mission manager 408, and tactical controller manager 410 work together to control communications between graphical user interfaces 412, mission components 418, tactical controller 403, and tactical controller 404. For example, when a mission component in mission components 418 requires information from tactical controller 403, a request for the information from the mission component is processed by mission manager 408 and tactical controller manager 410. In this example, the request and information returned by tactical controller 403 may be converted using one or both of group of tactical controller adapters 428 and group of mission component adapters 420.

In this illustrated example, techniques and adapters may be selected from a library of techniques and adapters by a component in mission components 418 for deployment to tactical controller 403 and tactical controller 404. The components of mission controller 400 are implemented in hardware, software, or a combination of hardware and software. A record of all operations performed by the components in mission controller may be stored in log 432.

The illustration of mission environment 200 and the different components in mission environment 200 in FIGS. 2-4 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, communications between different components may be made using at least one of wireless communications links or wired communications links. Wireless communications links may include signals sent using radio frequencies, microwaves, lasers beams, or other suitable mechanisms.

As yet another example, other components other than mission controller 233 or mission configurator 242 may coordinate tactical controllers 220 to control hardware 202. For example, a first tactical controller and a second tactical controller are present in the group of tactical controllers 220. The second tactical controller may identify effect 208 for the first tactical controller, and send task 234 to the first tactical controller for performance by hardware 202 to generate effect 208 for at least one of the electronic warfare operations or cyber mission operations. As another example, one or more other mission controllers may be in mission layer 214 in addition to mission controller 233.

Figure 5:
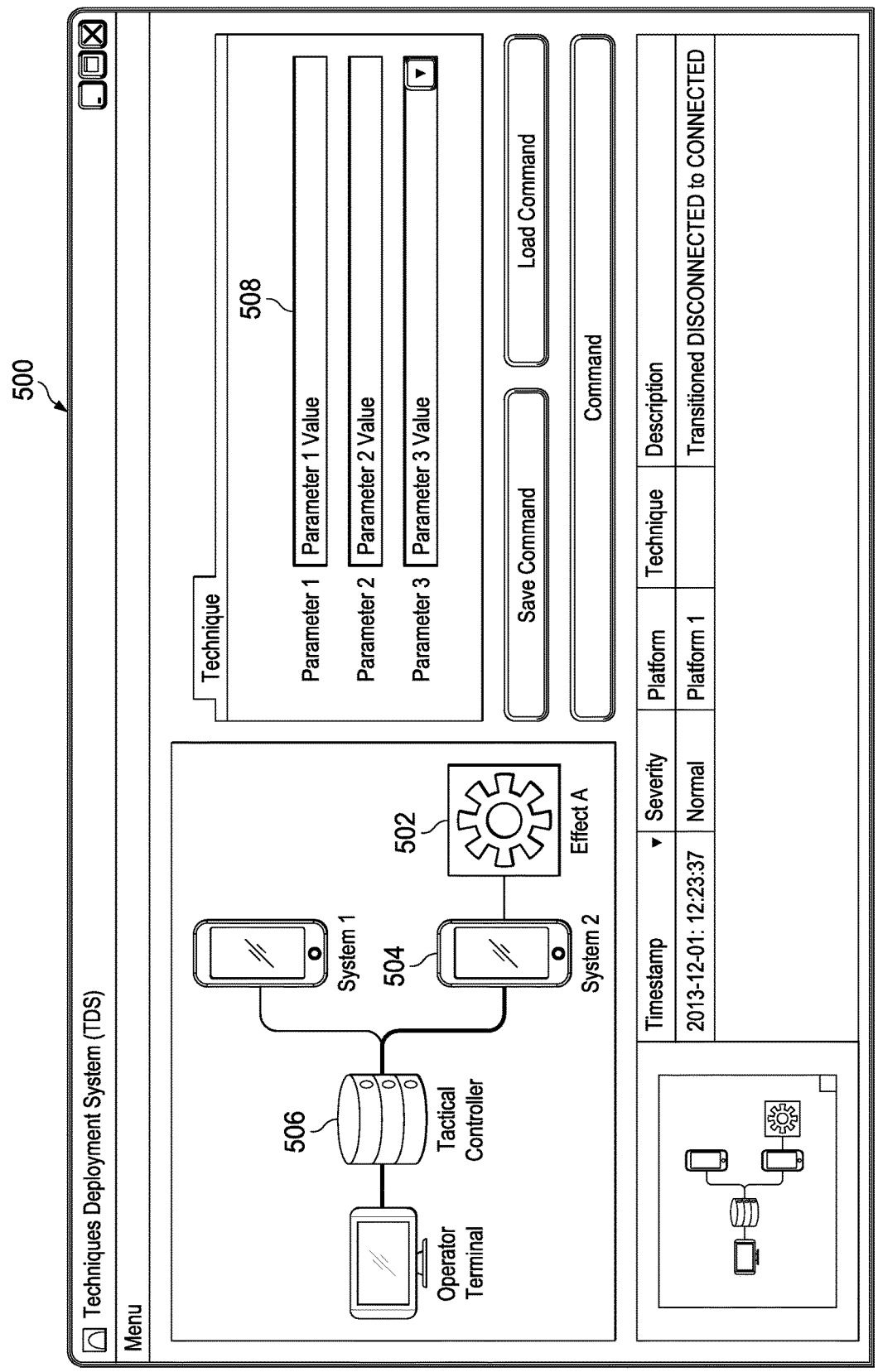
FIG. 5 is an illustration of a graphical user interface for managing a tactical controller in accordance with an illustrative embodiment.

Turning next to FIG. 5, an illustration of a graphical user interface for managing a tactical controller is depicted in accordance with an illustrative embodiment. As depicted, graphical user interface 500 is an example of an implementation of a graphical user interface in graphical user interfaces 312 shown in block form in FIG. 3. Graphical user interface 500 is used by a human operator to set parameters for techniques. In this manner, a human operator may configure techniques for use.

In this example, a human operator selecting effect 502 is used by system 504. System 504 is an example of a piece of hardware 202 shown in block form in FIG. 2. The selection to cause effect 502 is made based on at least one of a determination that system 504 is in communication with tactical controller 506, or a determination that system 504 is a type of hardware that can produce effect 502. Tactical controller 506 is an example of selected tactical controller 224 in FIG. 2.

As depicted, a human operator selects that system 504 is controlled by tactical controller 506. The selection of system 504 is made based on system 504 being accessible by tactical controller 506. For example, system 504 may be a piece of hardware located on a platform that includes tactical controller 506.

In this illustrative example, a human operator selects parameters 508 of a technique for use in tactical controller 506 for producing effect 502. In this example, human operator selectable options for parameters 508 are displayed in response to an identification of the technique for use in tactical controller 506 for using system 504 to produce effect 502. For example, graphical user interface 500 may dynamically display portions of data 322 in FIG. 3 as the human operator selectable options for parameters 508. In other examples, a human operator can enter parameters 508 using any other suitable type of interface for receiving operator input.

Figure 6:
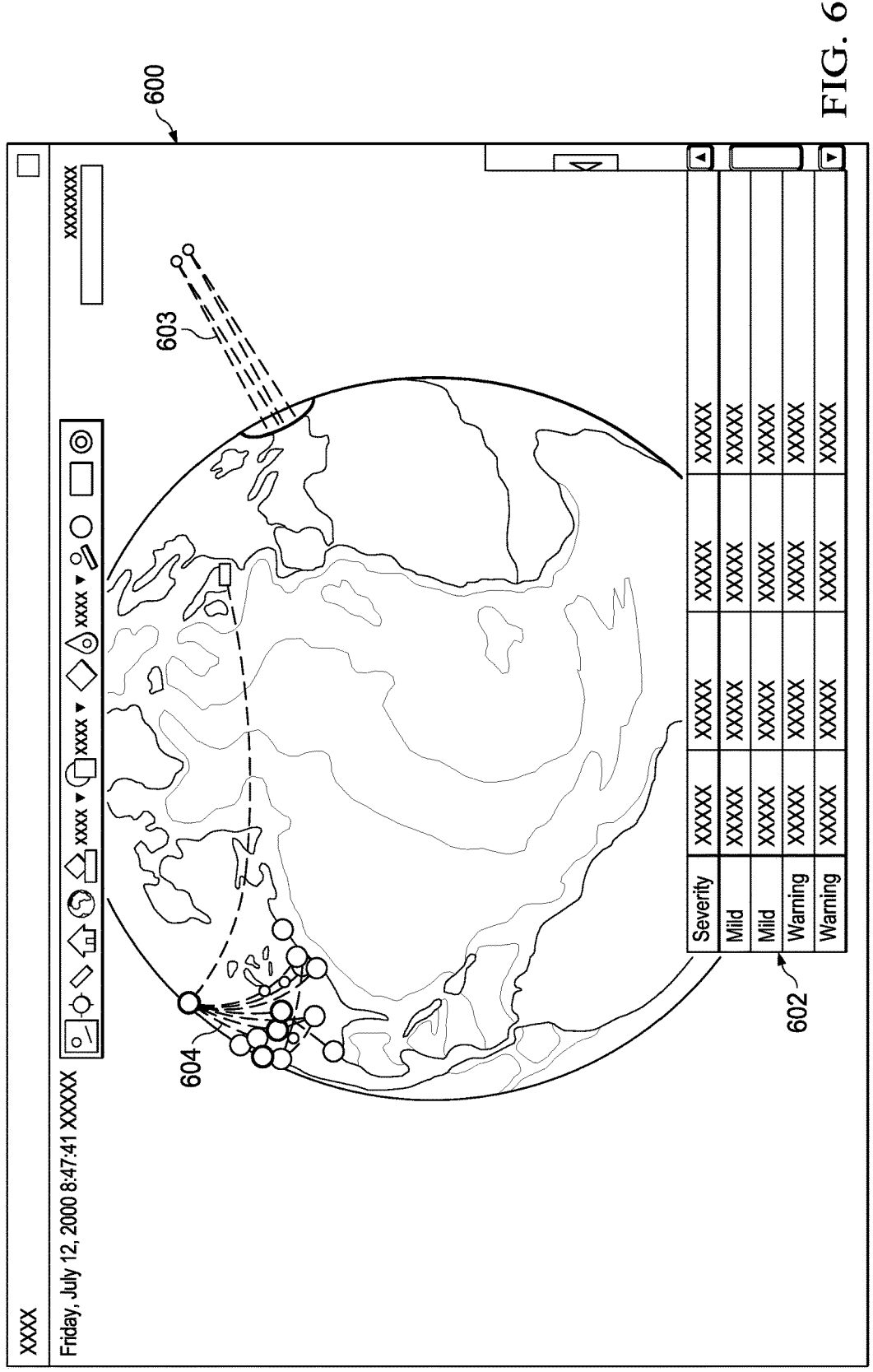
FIG. 6 is an illustration of a graphical user interface for a mission controller in accordance with an illustrative embodiment.

With reference now to FIG. 6, an illustration of a graphical user interface for a mission controller is depicted in accordance with an illustrative embodiment. As depicted, graphical user interface 600 is an example of an implementation of a graphical user interface for an electronic warfare mission in graphical user interfaces 412 shown in block form in FIG. 4.

In this example, graphical user interface 600 is used by a human operator to view mission status information. A list of information received from tactical controllers 602, status of satellite based platforms 603, and status of air, land, and sea based platforms 604 shown in graphical user interface 600 are examples of mission status information 422 shown in block form in FIG. 4.

Figure 7:
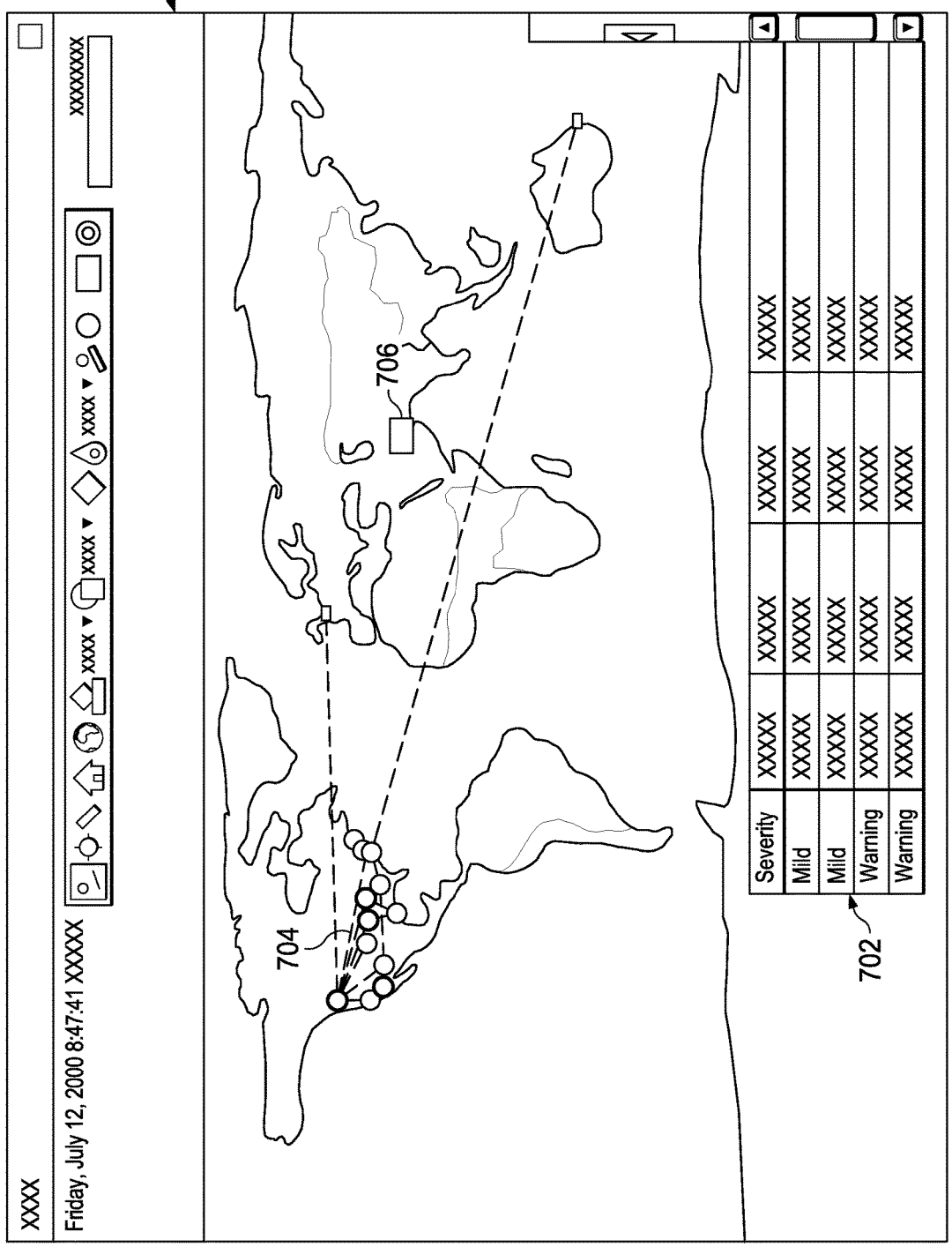
FIG. 7 is an illustration of a graphical user interface for a mission controller in accordance with an illustrative embodiment.

With reference next to FIG. 7, an illustration of a graphical user interface for a mission controller is depicted in accordance with an illustrative embodiment. As depicted, graphical user interface 700 is an example of an implementation of a graphical user interface for a cyber mission in graphical user interfaces 412 shown in block form in FIG. 4.

In this example, graphical user interface 700 is used by a human operator to view mission status information. A list of information received from tactical controllers 702, status of platforms 704, and status of a geographic location 706 shown in graphical user interface 700 are examples of mission status information 422 shown in block diagram form in FIG. 4.

Figure 8:
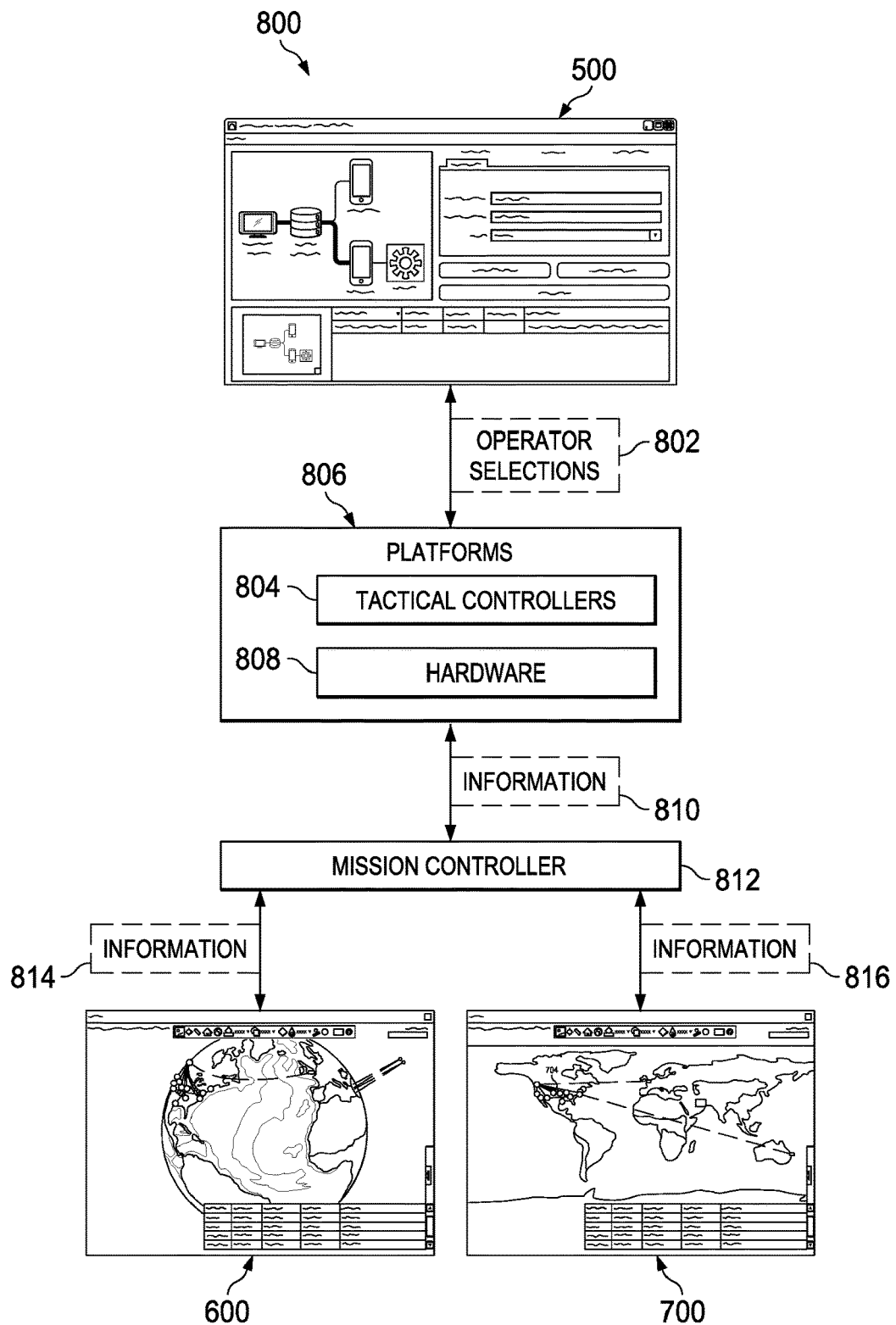
FIG. 8 is an illustration of a data flow of a process for controlling hardware in accordance with an illustrative embodiment.

Turning now to FIG. 8, an illustration of a data flow of a process for controlling hardware is depicted in accordance with an illustrative embodiment. As depicted, mission environment 800 is an example of an implementation of mission environment 200 shown in block form in FIG. 2.

Graphical user interface 500 in mission environment 800 in FIG. 8 is an example of a use of graphical user interface 500 in FIG. 5. Graphical user interface 600 is an example of a use of graphical user interface 600 in FIG. 6 and graphical user interface 700 is an example of a use of graphical user interface 700 in FIG. 7.

As depicted, operator selections 802 made on graphical user interface 500 are sent to tactical controllers 804 in platforms 806. In this illustrative example, operator selections 802 include at least one of groups of effects desired for pieces of hardware 808, or parameters for techniques for groups of tactical controllers 804 to use in controlling pieces of hardware 808 to produce the groups of effects.

In the illustrated example, tactical controllers 804 process information from the groups of hardware 808 to generate and send groups of information 810 to mission controller 812. As depicted, tactical controllers 804 use operator selections 802 to process tasks of missions. Each group in groups of information 810 is an example of mission status information 422 in FIG. 4. For example, a first group of mission status information in information 810 may be for a first mission, and a second group of mission status information may be for a second mission.

As depicted, mission controller 812 processes groups of information 810 to generate and send group of information 814 to graphical user interface 600 and group of information 816 to graphical user interface 700. Group of information 814 is an example of a list of information received from tactical controllers 602, status of satellite based platforms 603 and status of air, land, and sea based platforms 604 in FIG. 6. Group of information 816 is an example of a list of information received from tactical controllers 702, status of platforms 704, and status of a geographic location 706 in FIG. 7.

Figure 9:
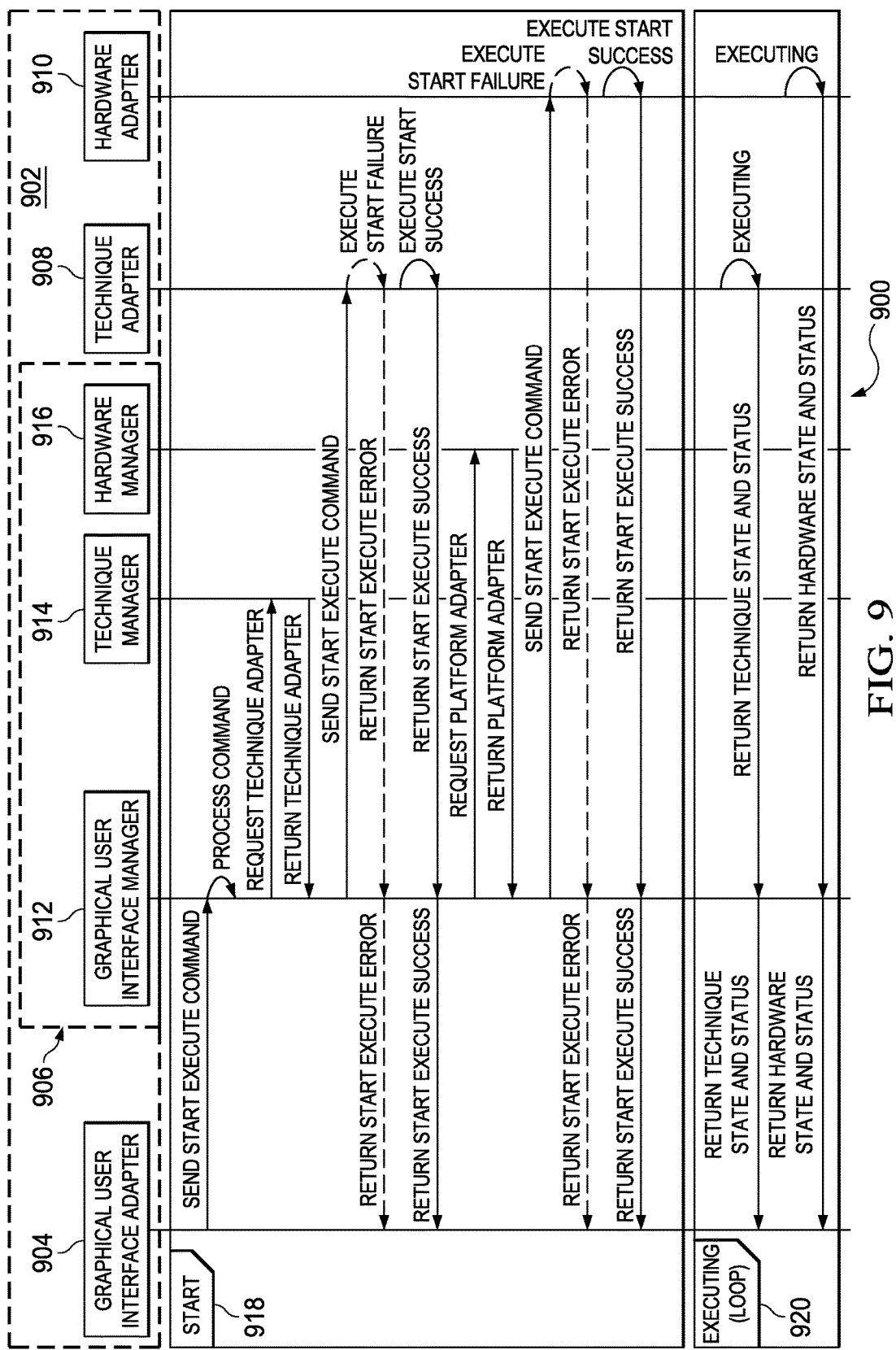
FIG. 9 is an illustration of a data flow for a tactical controller for generating an effect in accordance with an illustrative embodiment.

Turning to FIG. 9, an illustration of a data flow for a tactical controller for generating an effect is depicted in accordance with an illustrative embodiment. As depicted, data flow 900 shows a sequence of operations taken by components of tactical controller 902 to generate an effect. Tactical controller 902 is an example of tactical controller 300 in FIG. 3. Tactical controller 902 includes graphical user interface adapter 904, controller 906, technique adapter 908, and hardware adapter 910. Controller 906 includes graphical user interface manager 912, technique manager 914, and hardware manager 916.

As depicted, tactical controller 902 is assigned start task 918 to start a selected technique to generate a desired effect using selected hardware. When tactical controller 902 has successfully completed start task 918, tactical controller 902 is assigned execute task 920. Start task 918 and execute task 920 are sent to tactical controller 902 by another system. For example, the other system may be another tactical controller, other than tactical controller 902, or a mission controller. In this illustrative example, execute task 920 is to send information about execute task 920 to the other system that made the request for execute task 920 to be executed in tactical controller 902.

Figure 10:
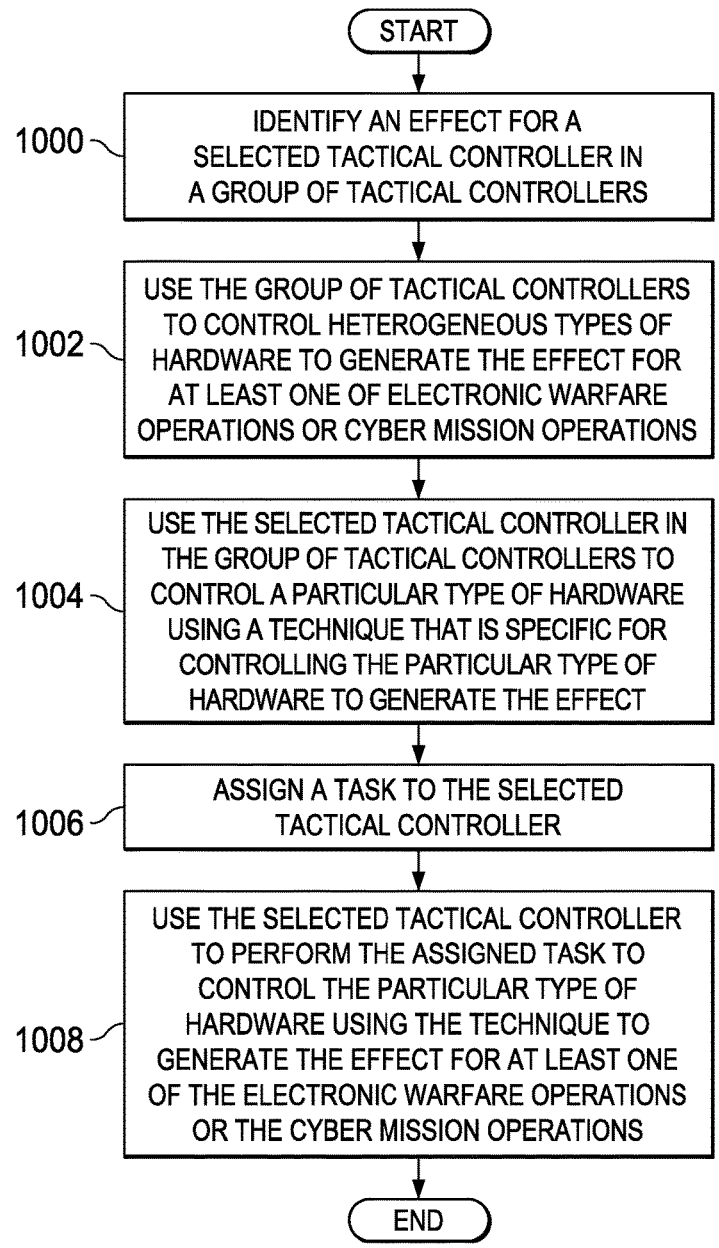
FIG. 10 is an illustration of a flowchart of a process for generating an effect in accordance with an illustrative embodiment.

Turning next to FIG. 10, an illustration of a flowchart of a process for generating an effect is depicted in accordance with an illustrative embodiment. The process illustrated in FIG. 10 may be implemented in mission environment 200 in FIG. 2. In particular, the different operations in this flowchart may be performed using techniques deployment system 206 to control hardware 202 to generate effect 208 for electronic warfare operations 210 or cyber mission operations 212 in FIG. 2. For example, the different operations in this process may be implemented using mission controller 233 and selected tactical controller 224 in FIG. 2.

The process begins by identifying an effect for a selected tactical controller in a group of tactical controllers (operation 1000). The process uses the group of tactical controllers to control heterogeneous types of hardware to generate the effect for at least one of electronic warfare operations or cyber mission operations (operation 1002). The process uses the selected tactical controller in the group of tactical controllers to control a particular type of hardware using a technique that is specific for controlling the particular type of hardware to generate the effect (operation 1004).

The process next assigns a task to the selected tactical controller (operation 1006). The process then uses the selected tactical controller to perform the assigned task to control the particular type of hardware using the technique to generate the effect for at least one of the electronic warfare operations or the cyber mission operations (operation 1008) with the process terminating thereafter. Operations 1000-1008 may be repeated a number of times to generate a number of effects selected from effects for electronic warfare operations or cyber mission operations.

Figure 11:
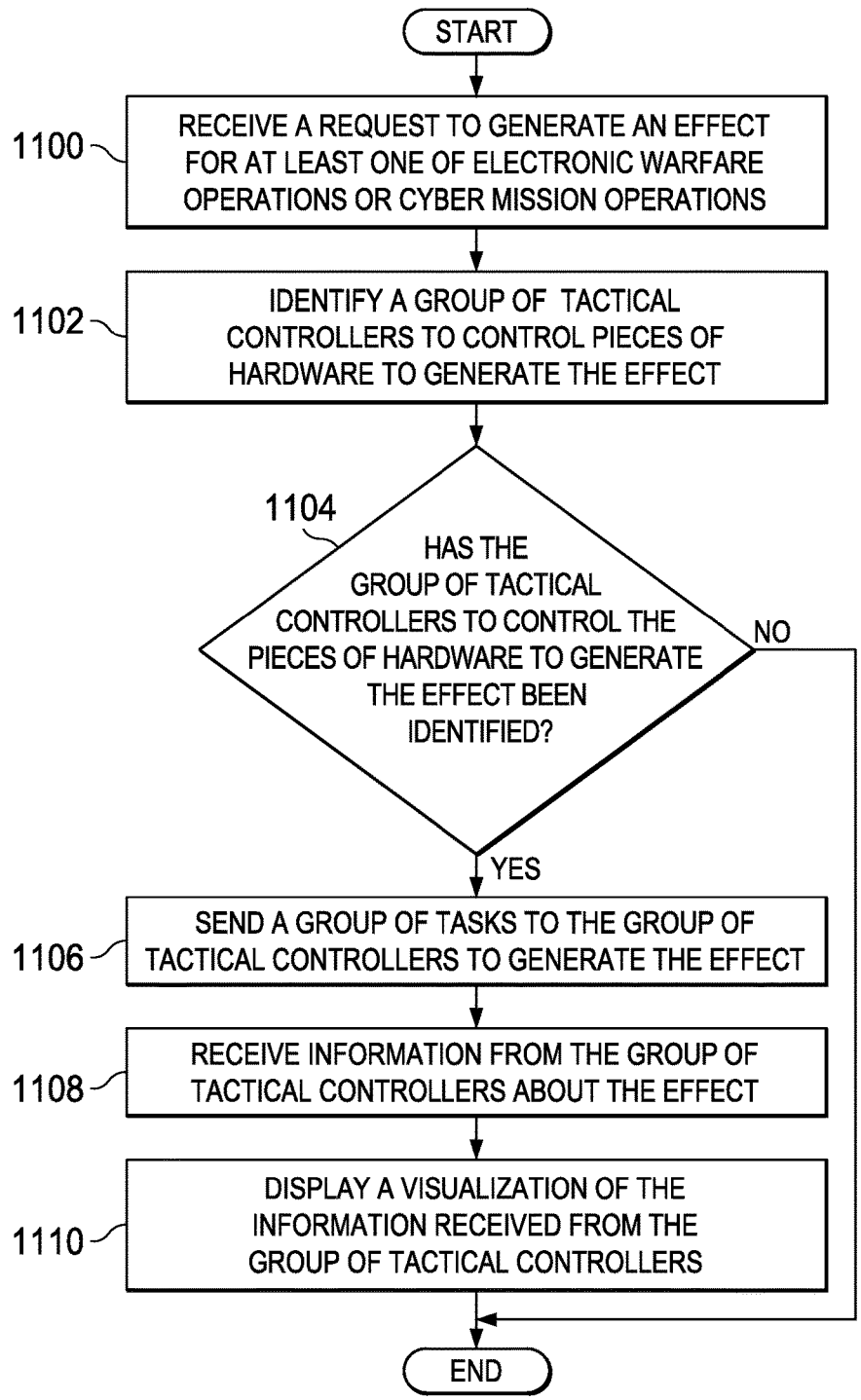
FIG. 11 is an illustration of a flowchart of a process for generating an effect in accordance with an illustrative embodiment.

With reference next to FIG. 11, an illustration of a flowchart of a process for generating an effect is depicted in accordance with an illustrative embodiment. The process illustrated in FIG. 11 may be implemented in mission environment 200 in FIG. 2. In particular, the different operations in this flowchart may be performed using techniques deployment system 206 to control hardware 202 to generate effect 208 for electronic warfare operations 210 or cyber mission operations 212 in FIG. 2. For example, the different operations in this process may be implemented using mission controller 233 and selected tactical controller 224 in FIG. 2.

The process begins by receiving a request to generate an effect for at least one of electronic warfare operations or cyber mission operations (operation 1100). The process next identifies a group of tactical controllers to control pieces of hardware to generate the effect (operation 1102).

The process then determines whether the group of tactical controllers to control the pieces of hardware to generate the effect has been identified (operation 1104). If the group of tactical controllers to control pieces of hardware to generate the effect have not been identified, the process terminates. If the group of tactical controllers to control pieces of hardware to generate the effect have been identified, the process next sends a group of tasks to the group of tactical controllers to generate the effect (operation 1106).

The process receives information from the group of tactical controllers about the effect (operation 1108). The process then displays a visualization of the information received from the group of tactical controllers (operation 1110) with the process terminating thereafter. FIG. 6 shows an example of the visualization of the information in operation 1110. In particular, the list of information received from tactical controllers 602, status of satellite based platforms 603, and status of air, land, and sea based platforms 604 all shown in FIG. 6, are examples of the information visualized in operation 1110. Operations 1100-1110 may be repeated a number of times to generate a group of effects selected from effects 246 for electronic warfare operations 210 or cyber mission operations 212.

Figure 12:
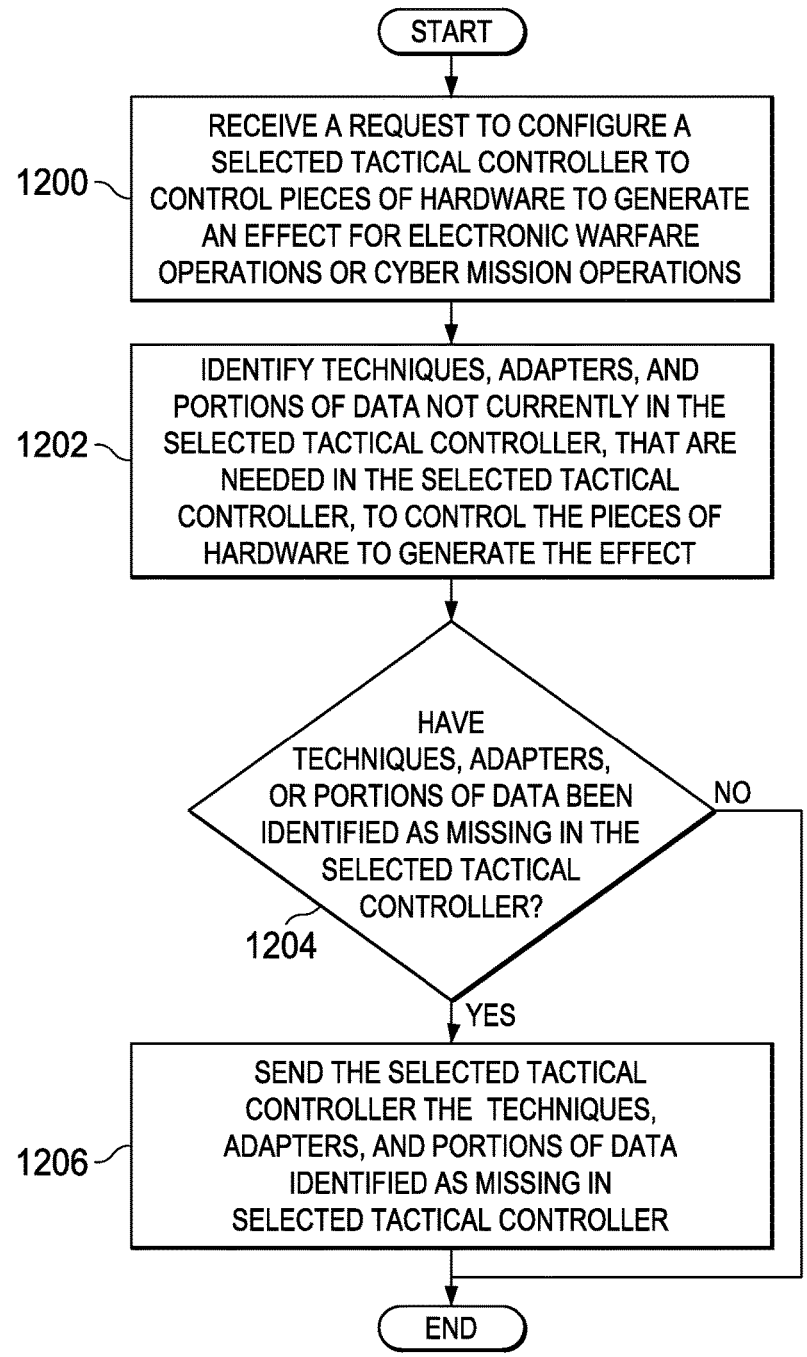
FIG. 12 is an illustration of a flowchart of a process for configuring a tactical controller to control pieces of hardware to generate an effect in accordance with an illustrative embodiment.

With reference next to FIG. 12, an illustration of a flowchart of a process for configuring a tactical controller to control pieces of hardware to generate an effect is depicted in accordance with an illustrative embodiment. The process illustrated in FIG. 12 may be implemented in mission environment 200 in FIG. 2. In particular, the different operations in this flowchart may be performed using techniques deployment system 206 to configure selected tactical controller 224 to control pieces of hardware 202 to generate effects 246 for electronic warfare operations 210 or cyber mission operations 212 in FIG. 2. For example, the different operations in this process may be implemented using mission configurator 242, mission controller 233, and selected tactical controller 224 in FIG. 2.

The process begins by receiving a request to configure a selected tactical controller to control pieces of hardware to generate an effect for electronic warfare operations or cyber mission operations (operation 1200). The process next identifies techniques, adapters, and portions of data not currently in the selected tactical controller, that are needed in the selected tactical controller, to control the pieces of hardware to generate the effect (operation 1202). The adapters in this process are examples of group of graphical user interface adapters 314, group of technique adapters 320, and group of hardware adapters 324 in FIG. 3. The portions of data in this process are an example of portions of data 322 in FIG. 3.

A determination is then made as to whether techniques, adapters, or portions of data have been identified as missing in the selected tactical controller (operation 1204). If techniques, adapters, or portions of data have not been identified as missing in the selected tactical controller, the process terminates. If techniques, adapters, or portions of data have been identified as missing in the selected tactical controller, the process next sends the selected tactical controller the techniques, the adapters, and the portions of data identified as missing in selected tactical controller (operation 1206), with the process terminating thereafter.

Operations 1200-1206 may be repeated a number of times to configure a group of tactical controllers selected from tactical controllers 220 in FIG. 2 to control pieces of hardware 202 to generate effects 246 for electronic warfare operations 210 or cyber mission operations 212.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, some blocks may be unnecessary and other blocks may be added in addition to the illustrated blocks in a flowchart or block diagram.

Figure 13:
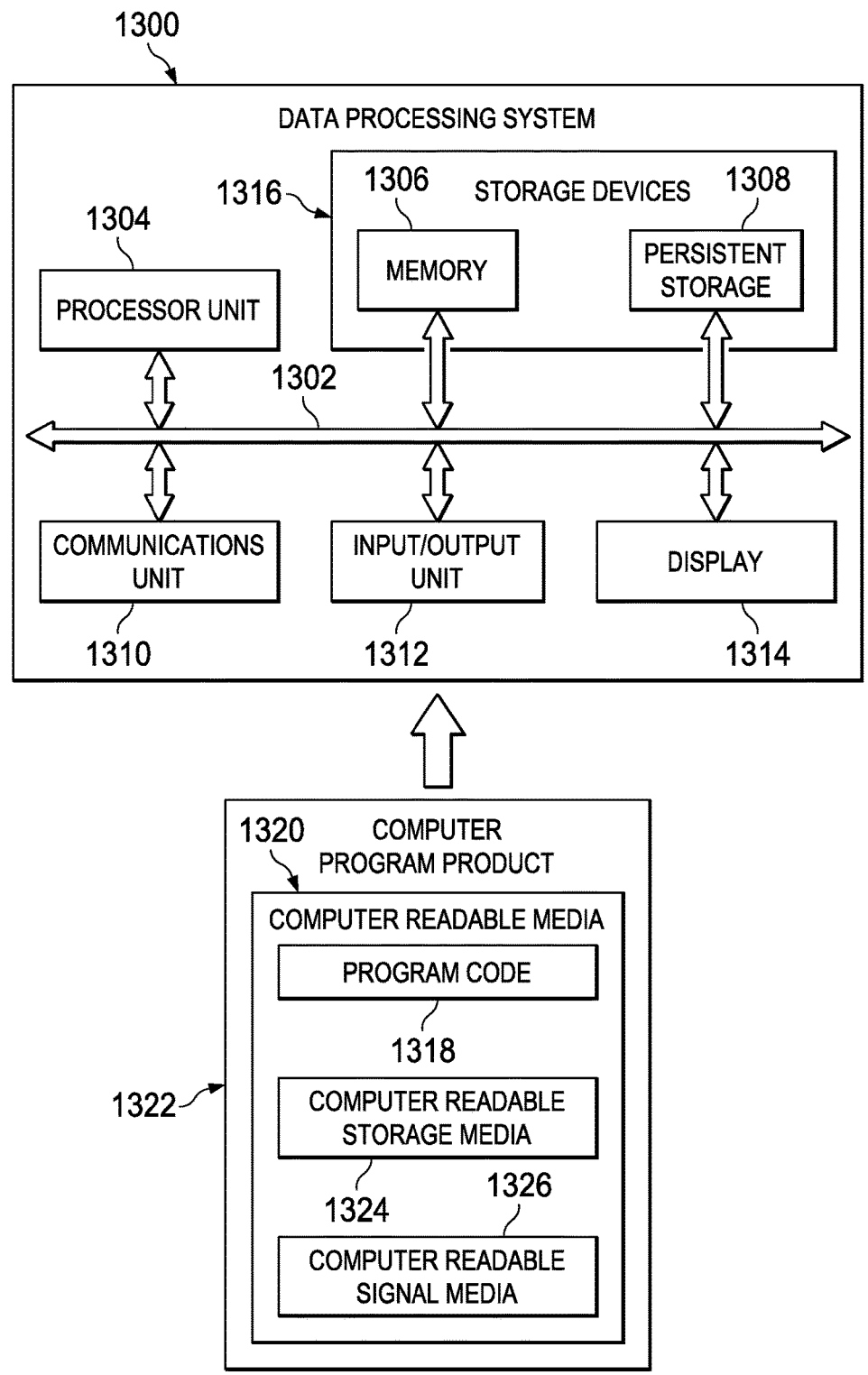
FIG. 13 is an illustration of a data processing system in the form of a block diagram in accordance with an illustrative embodiment.

Turning now to FIG. 13, an illustration of a data processing system in the form of a block diagram is depicted in accordance with an illustrative embodiment. Data processing system 1300 may be used to implement one or more computers in techniques deployment system 206 in FIG. 2. As depicted, data processing system 1300 includes communications framework 1302, which provides communications between processor unit 1304, storage devices 1316, communications unit 1310, input/output unit 1312, and display 1314. In some cases, communications framework 1302 may be implemented as a bus system.

Processor unit 1304 is configured to execute instructions for software to perform a number of operations. Processor unit 1304 may comprise a number of processors, a multi-processor core, and/or some other type of processor, depending on the implementation. In some cases, processor unit 1304 may take the form of a hardware unit, such as a circuit system, an application specific integrated circuit (ASIC), a programmable logic device, or some other suitable type of hardware unit.

Instructions for the operating system, applications, and/or programs run by processor unit 1304 may be located in storage devices 1316. Storage devices 1316 may be in communication with processor unit 1304 through communications framework 1302. As used herein, a storage device, also referred to as a computer readable storage device, is any piece of hardware capable of storing information on a temporary and/or permanent basis. This information may include, but is not limited to, data, program code, and/or other information.

Memory 1306 and persistent storage 1308 are examples of storage devices 1316. Memory 1306 may take the form of, for example, a random access memory or some type of volatile or non-volatile storage device. Persistent storage 1308 may comprise any number of components or devices. For example, persistent storage 1308 may comprise a hard drive, a flash memory, a rewritable optical disk, a rewritable magnetic tape, or some combination of the above. The media used by persistent storage 1308 may or may not be removable.

Communications unit 1310 allows data processing system 1300 to communicate with other data processing systems and/or devices. Communications unit 1310 may provide communications using physical and/or wireless communications links.

Input/output unit 1312 allows input to be received from and output to be sent to other devices connected to data processing system 1300. For example, input/output unit 1312 may allow user input to be received through a keyboard, a mouse, and/or some other type of input device. As another example, input/output unit 1312 may allow output to be sent to a printer connected to data processing system 1300.

Display 1314 is configured to display information to a user. Display 1314 may comprise, for example, without limitation, a monitor, a touch screen, a laser display, a holographic display, a virtual display device, and/or some other type of display device.

In this illustrative example, the processes of the different illustrative embodiments may be performed by processor unit 1304 using computer-implemented instructions. These instructions may be referred to as program code, computer usable program code, or computer readable program code and may be read and executed by one or more processors in processor unit 1304.

In these examples, program code 1318 is located in a functional form on computer readable media 1320, which is selectively removable, and may be loaded onto or transferred to data processing system 1300 for execution by processor unit 1304. Program code 1318 and computer readable media 1320 together form computer program product 1322. In this illustrative example, computer readable media 1320 may be computer readable storage media 1324 or computer readable signal media 1326.

Computer readable storage media 1324 is a physical or tangible storage device used to store program code 1318 rather than a medium that propagates or transmits program code 1318. Computer readable storage media 1324 may be, for example, without limitation, an optical or magnetic disk or a persistent storage device that is connected to data processing system 1300.

Alternatively, program code 1318 may be transferred to data processing system 1300 using computer readable signal media 1326. Computer readable signal media 1326 may be, for example, a propagated data signal including program code 1318. This data signal may be an electromagnetic signal, an optical signal, and/or some other type of signal that can be transmitted over physical and/or wireless communications links.

The illustration of data processing system 1300 in FIG. 13 is not meant to provide architectural limitations to the manner in which the illustrative embodiments may be implemented. The different illustrative embodiments may be implemented in a data processing system that includes components in addition to or in place of those illustrated for data processing system 1300. Further, components shown in FIG. 13 may be varied from the illustrative examples shown.

Thus, the illustrative embodiments provide a method and apparatus for generating effects. In particular, one illustrative embodiment provides a method and apparatus for controlling hardware to generate effects for electronic warfare missions and cyber missions. For example, an apparatus comprises a mission controller and a group of tactical controllers. In this example, the apparatus identifies an effect for a tactical controller selected from the group of tactical controllers. The group of tactical controllers control heterogeneous types of hardware to generate effects for at least one of electronic warfare operations or cyber mission operations. The selected tactical controller controls a particular type of hardware using a technique that is specific for controlling the particular type of hardware to generate the effect. The apparatus then assigns a task to the selected tactical controller. The selected tactical controller performs the assigned task to control the particular type of hardware using the technique to generate the effect for at least one of the electronic warfare operations or the cyber mission operations.

In the illustrative embodiments, graphical user interfaces may be a common interface for human operators. These human operators do not need to use different graphical user interfaces for each piece of hardware that is of a different type than other pieces of hardware. Additionally, in the illustrative embodiments, techniques for controlling particular pieces of hardware to generate effects may be common techniques for disparate sources of hardware. A technique for controlling a particular piece of hardware from a first source to produce an effect does not have to be changed to control a different piece of hardware provided by disparate source to produce the same effect.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A techniques deployment system comprising:
a display system;
a graphical user interface displayed on the display system;
a group of tactical controllers that control heterogeneous types of hardware; and
a mission controller; wherein the graphical user interface is configured:
to display a visualization of information received from the group of tactical controllers;
wherein the mission controller is configured:
to receive a selection of an effect for at least one of electronic warfare operations or cyber mission operations, wherein the effect is selected from the group consisting of spoofing information, interrupting communications, degrading performance, bypassing a firewall, collecting information, rewriting packets, and blocking wireless signals;
to receive parameters for a technique that is specific for controlling a particular type of hardware to generate the effect, wherein the particular type of hardware is selected from the group consisting of a radio, a wireless access point, and a phased array antenna;
in response to receiving the selection of the effect, to determine whether the particular type of hardware is capable of producing the effect;
in response to determining that the particular type of hardware is capable of producing the effect, to assign a task for producing the effect to a selected tactical controller of the group of tactical controllers; and
wherein the selected tactical controller is configured:
in response to the task assigned by the mission controller, to control the particular type of hardware using the technique and the parameters to generate the effect.

2. The techniques deployment system of claim 1, further comprising:
a plurality of hardware of a different type of the heterogeneous types of hardware.

3. The techniques deployment system of claim 2, wherein the particular type of hardware is selected from one of a radio, a wireless access point, and a phased array antenna.

4. The techniques deployment system of claim 3, wherein each of the plurality of hardware is located on a mobile platform of a group of platforms, wherein the mission controller is further configured:
to identify the effects for the group of tactical controllers based on types of hardware located on each mobile platform in the group of platforms.

5. The techniques deployment system of claim 4, further comprising:
the group of platforms, wherein each mobile platform in the group of platforms is selected from one of an aircraft, a surface ship, a tank, a personnel carrier, a train, a spacecraft, a space station, a satellite, a submarine, and an automobile.

6. The techniques deployment system of claim 5, wherein information received from the group of tactical controllers comprises at least one of a status of tasks assigned to tactical controllers, a status of communications links with the tactical controllers, a health of tactical controllers, and a health of hardware used by tactical controllers.

7. The techniques deployment system of claim 1 further comprising:
a mission configurator that selects a set of tasks for multiple pieces of hardware to generate a group of effects and selects a group of techniques for the group of tactical controllers for use in controlling the multiple pieces of hardware to generate the group of effects, wherein the mission configurator identifies the group of effects for the multiple pieces of hardware, identifies the group of techniques, and sends the group of techniques identified to the group of tactical controllers.

8. The techniques deployment system of claim 1, wherein in controlling the particular type of hardware, the selected tactical controller is further configured:
to direct a phased array antenna to use directed energy to inhibit at least one of communication or detection based on use of the electromagnetic spectrum.

9. The techniques deployment system of claim 1, wherein in controlling the particular type of hardware, the selected tactical controller is further configured:
to direct a wireless access point to generate the effect for the cyber mission operations, wherein the cyber mission operations involve at least one of obtaining, changing, or inserting information with respect to a network, wherein the information is at least one of data, programs, voice data, images, or videos transmitted over the network.

10. The techniques deployment system of claim 1, wherein receiving the mission status information, the mission controller is further configured:
to receive the mission status information from the group of tactical controllers, wherein the mission status information is received in a first format used by the selected tactical controller;
to convert the mission status information from the first format to a second format used by the graphical user interface of the mission controller.

11. The techniques deployment system of claim 10, wherein assigning the task to the selected tactical controller, the mission controller is further configured:
to convert the task from the second format used by the graphical user interface of the mission controller to the first format used by the selected tactical controller; and
to send the task to the selected tactical controller for performance by the particular type of hardware using the technique to generate the effect.

12. The techniques deployment system of claim 1, wherein the mission controller is further configured:
to receive a request for information from the selected tactical controller, wherein the request is for information from a second tactical controller in the group of tactical controllers;
to convert the request from a first format used by the selected tactical controller to a second format used by the second tactical controller; and
to send the request in the second format to the second tactical controller.

13. A method for generating an effect, the method comprising:
receiving, by a mission controller, mission status information from a group of tactical controllers, wherein the mission status information comprises at least one of a status of tasks assigned to tactical controllers, a status of communications links with the tactical controllers, a health of tactical controllers, or a health of hardware used by tactical controllers;
displaying, by the mission controller, a visualization of the mission status information on a graphical user interface;
identifying, by a mission controller, the effects for the group of tactical controllers, wherein the group of tactical controllers control heterogeneous types of hardware to generate the effect for at least one of electronic warfare operations or cyber mission operations, wherein the heterogeneous types of hardware is selected from the group consisting of a radio, a wireless access point, and a phased array antenna;

determining, by the mission controller based on the mission status information received from a selected tactical controller, whether a particular type of hardware controlled by the selected tactical controller is capable of generating the effect;

responsive to determining that the particular type of hardware is capable of generating the effect, assigning, by the mission controller, a task for producing the effect to the selected tactical controller; and performing the task by the selected tactical controller to control the particular type of hardware using the technique to generate the effect for the at least one of the electronic warfare operations or the cyber mission operations, wherein the effect is selected from the group consisting of spoofing information, interrupting communications, degrading performance, bypassing a firewall, collecting information, rewriting packets, and blocking wireless signals.

14. The method of claim 13, further comprising:
receiving, by the mission controller, a selection of the task from the graphical user interface;
wherein assigning the task to the selected tactical controller is further responsive to receiving the selection of the task from the graphical user interface.

15. The method of claim 13, wherein in controlling the particular type of hardware, the selected tactical controller:
directs a phased array antenna to use directed energy to inhibit at least one of communication or detection based on use of the electromagnetic spectrum.

16. The method of claim 13, wherein in controlling the particular type of hardware, the selected tactical controller:
directs a wireless access point to generate the effect for the cyber mission operations, wherein the cyber mission operations involve at least one of obtaining, changing, or inserting information with respect to a network, wherein the information is at least one of data, programs, voice data, images, or videos transmitted over the network.

17. The method of claim 13, wherein the group of tactical controllers is located on a group of platforms, the method further comprising:
identifying the effects for the group of tactical controllers based on types of hardware located on each platform in the group of platforms, wherein each platform in the group of platforms is selected from one of an aircraft, a surface ship, a tank, a personnel carrier, a train, a spacecraft, a space station, a satellite, a submarine, and an automobile.

18. The method of claim 13, wherein receiving the mission status information from the group of tactical controllers further comprises:
receiving, by the mission controller, the mission status information from the group of tactical controllers, wherein the mission status information is received in a first format used by the selected tactical controller;
converting, by the mission controller, the mission status information from the first format to a second format used by the graphical user interface of the mission controller.

19. The method of claim 18, wherein assigning the task to the selected tactical controller further comprises:
converting, by the mission controller, the task from the second format used by the graphical user interface of the mission controller to the first format used by the selected tactical controller; and
sending, by the mission controller, the task to the selected tactical controller for performance by the particular type of hardware using the technique to generate the effect.

20. The method of claim 13 further comprising:
receiving, by the mission controller, a request for information from the selected tactical controller, wherein the request is for information from a second tactical controller in the group of tactical controllers;
converting, by the mission controller, the request from a first format used by the selected tactical controller to a second format used by the second tactical controller; and
sending, by the mission controller, the request in the second format to the second tactical controller.

* * * * *